US008711880B2

(12) United States Patent
Weeks

(10) Patent No.: US 8,711,880 B2
(45) Date of Patent: Apr. 29, 2014

(54) METHOD FOR RESERVING NETWORK BANDWIDTH FOR VERSIONED NETWORK SERVICES

(75) Inventor: Russell Weeks, Coquitlam (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 254 days.

(21) Appl. No.: 13/049,828

(22) Filed: Mar. 16, 2011

(65) Prior Publication Data

US 2012/0236877 A1    Sep. 20, 2012

(51) Int. Cl.
*H04J 3/16* (2006.01)
*H04L 12/28* (2006.01)
*G06F 3/01* (2006.01)
*G06F 15/16* (2006.01)
*H04L 12/24* (2006.01)
*H04L 5/00* (2006.01)
*H04L 12/70* (2013.01)

(52) U.S. Cl.
CPC .......... *H04L 41/0896* (2013.01); *H04L 41/145* (2013.01); *H04L 41/5045* (2013.01); *H04L 2012/5632* (2013.01); *H04L 5/0064* (2013.01)
USPC ....... 370/468; 370/352; 370/395.21; 715/736

(58) Field of Classification Search
CPC .............. H04L 41/0896; H04L 41/145; H04L 41/5045; H04L 2012/5632; H04L 5/0064
USPC .......... 370/229–353, 395, 436–493; 709/238, 709/241; 715/736; 705/1
See application file for complete search history.

(56) References Cited

U.S. PATENT DOCUMENTS

| 7,644,180 B1* | 1/2010 | Nucci et al. .................... 709/238 |
| 2003/0033162 A1* | 2/2003 | Houssiaux et al. ................ 705/1 |
| 2004/0205237 A1 | 10/2004 | Doshi et al. |
| 2004/0228363 A1* | 11/2004 | Adamczyk et al. ........... 370/468 |
| 2010/0325551 A1* | 12/2010 | Lauwers et al. .............. 715/736 |

FOREIGN PATENT DOCUMENTS

| EP | 1111840 A2 | 6/2001 |
| EP | 1763180 A1 | 3/2007 |
| WO | 2010001198 A1 | 1/2010 |

OTHER PUBLICATIONS

"NetOp NSM Application Overview NetOp Network Service Manager, User Guide," May 25, 2010, 39 pages, Version 6.3.1, Ericsson AB.
"Service Builder Guide NetOp Network Service Manager, Operating Instructions," Nov. 29, 2010, 119 pages, Version 6.4.1, Ericsson AB.

(Continued)

*Primary Examiner* — Jung Park
*Assistant Examiner* — Chuong M Nguyen
(74) *Attorney, Agent, or Firm* — Blakely Sokoloff Taylor & Zafman LLP

(57) ABSTRACT

Methods and apparatus to minimize the amount of bandwidth reserved for versioned network services are described. According to one embodiment of the invention, a bandwidth reservation component in a network service manager server receives a change to a service version in a service family. The bandwidth reservation component determines that the change would affect a reserved bandwidth on at least one of the network links of the service version. The bandwidth reservation component analyzes whether to accept the change based on how the change would affect the reserved bandwidth. The bandwidth reservation component changes on each of the network links the reserved bandwidth according to the change if the change is accepted.

20 Claims, 8 Drawing Sheets

(56) References Cited

OTHER PUBLICATIONS

"NetOp NSM Application Overview NetOp Network Service Manager, User Guide," Nov. 26, 2010, 49 pages, Version 6.4.1, Ericsson AB.

R. Braden et al., "Resource ReSerVation Protocol (RSVP)—Version 1 Functional Specification," Network Working Group, Request for Comments: 2205, Sep. 1997, 113 pages.

D. Awduche et al., "RSVP-TE: Extensions to RSVP for LSP Tunnels," Network Working Group, Request for Comments: 3209, Dec. 2001, 62 pages, The Internet Society.

A. Farrel et al., "Inter-Domain MPLS and GMPLS Traffic Engineering—Resource Reservation Protocol-Traffic Engineering (RSVP-TE) Extensions," Network Working Group, Request for Comments: 5151, Feb. 2008, 26 pages.

* cited by examiner

| SERVICE FAMILY | VERSION ORIGINATED AT TIME (N) | STATUS OF VERSION AT TIME (N) |
|---|---|---|
| F1 | (1) VERSION 1 (A)=(B) | (1-7) ACTIVATED |
| F2 | (1) VERSION 1 (A)=(B) | (1-2, 5-7) ACTIVATED  (3-4) DESIGN COMPLETE |
| | (2) VERSION 2 (A)=(B) | (2) IN DESIGN  (5) DESIGN COMPLETE  (3-4) ACTIVATED  (6-7) OBSOLETE |
| | (4) VERSION 3 (A)≡(B) | (4) IN DESIGN |
| | (7) VERSION 4 (A)—(B) | (7) DESIGN COMPLETE |
FIG. 4
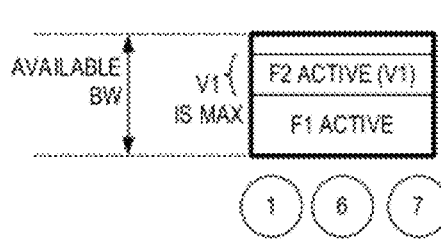
FIG. 5A
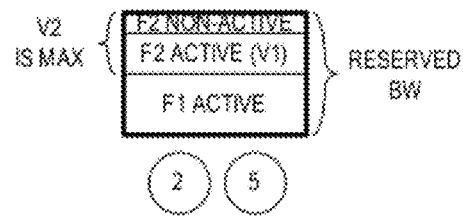
FIG. 5B
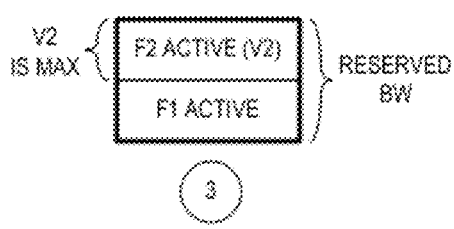
FIG. 5C
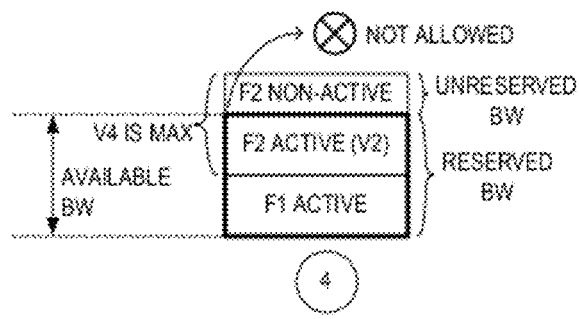
FIG. 5D

METHOD FOR RESERVING NETWORK BANDWIDTH FOR VERSIONED NETWORK SERVICES

FIELD

Embodiments of the invention relate to the field of computer networks; and more specifically, to reserving bandwidth for network services.

BACKGROUND

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

In a hierarchical network, the backhaul portion of the network includes the intermediate links between the core, or backbone, of the network and the small subnetworks at the edge. For example, while computers communicating within a single local area network (LAN) in an enterprise constitute a local subnetwork, the connection between the LAN and the rest of the world begins with a backhaul link to the core of the service provider's network. Some specific examples of network elements in such a network include edge routers (ER), for example SmartEdge Router from Ericsson, Inc., that connect the backbone portion of the network to the backhaul portion of the network. Network elements that make up the backhaul portion include packet optical transport platform devices (POTP) that combine layer-2 (L2) Ethernet aggregation functionality with legacy synchronous optical network (SONET) or synchronous digital hierarchy (SDH) support. One example of a POTP is an Optical MultiService transport element (OMS) from Ericsson, Inc. that provides Ethernet internetworking with core networks based on SDH. OMS can provide connectivity to an enterprise customer directly. OMS can also be connected to mobile backhaul gateway devices such as mini-links to interface with radio base stations or to digital subscriber line access multiplexer devices (DSLAMs) to provide connectivity to residential customers.

These network elements may be distributed all over the world, and utilizing the existing networks to provide low-cost virtual private networks (VPN) for enterprises has gradually become a major concern of carriers. Designing and provisioning these distributed networks can be a complex and labor-intensive task involving configurations of numerous different network elements across network paths. Adding to the complexity of managing such networks, a wide variety of service types are deployed within a network. Some of these service types include Layer 2 Multiprotocol Label Switching (MPLS) Virtual Leased Lines (VLLs) and Virtual Private LAN Service (VPLS), Layer 3 MPLS Border Gateway Protocol (BGP) VPNs, site-to-site IP Security (IPSec) VPNs, and legacy Layer 2 circuit-based Virtual LANs (VLANs). Another service type is MPLS-Transport Profile (TP), which is an extension of MPLS that includes characteristics and enhancements to meet packet transport requirements. Each service type may carry a mix of subscriber services such as video-on-demand or pre-paid wireless access with each of these subscriber services having a different level of Quality of Service (QoS) requirement. By providing a centralized tool to design and provision these various services, a network service manager simplifies a service designer's tasks of creating and managing complex services in a network. A network service manager is a service provisioning application that is implemented in and part of a network service manager server system. The network service manager server is interconnected to and manages network elements in a network. The network service manager server communicates with the network elements in a network to configure and provision the network elements and provides network monitoring, troubleshooting and reporting capabilities.

Protocols such as Resource Reservation Protocol (RSVP) allows for sequential reservation of resources in network elements across network paths to perform decentralized network bandwidth reservation. RSVP works by establishing a RSVP session through the exchange of reservation signaling in protocol messages along the network path. Each RSVP-supported network element along the network path that the protocol messages pass through reserves the resources as specified in the protocol messages. More recent developments such as the traffic engineering extension of RSVP (RSVP-TE)) seeks to improve on RSVP by allowing the flexibility to adjust nodes and change network paths in an established session and still maintain the same level of QoS.

SUMMARY

Methods and apparatus to minimize the amount of bandwidth reserved for each network link in a network that includes a plurality of network elements whose bandwidth is being managed by a network service manager server are described. Each of the network links couples different interfaces on different network elements. According to one embodiment, a bandwidth reservation component receives a change to a service family within a set of one more service families. Each of the service families includes a set of one or more service versions, and each of the service versions in the service families has one or more network links and a bandwidth requirement representation for each of those links. Each of the service versions has a status being one of obsolete and a set of two or more non-obsolete statuses including the status of activated. At most, one of the service versions in each of the service families can have the status of activated at a time. The bandwidth reservation component determines that the change would affect a reserved bandwidth on at least one of the network links affected by the change. The reserved bandwidth for each of the network links is the bandwidth represented by a total of the maximum bandwidth requirement representation for that network link by any non-obsolete service versions within each of the service families, rather than a total of all of the bandwidth requirement representation of all of the non-obsolete service versions. When at least two of the service versions within a service family specify different bandwidth requirement representations for the same affected network link, the larger of these bandwidth requirement representations is the maximum bandwidth requirement representation for the service family. The bandwidth reservation component analyzes whether to accept the change based on how the change would affect the reserved bandwidth relative to an available bandwidth on each of the network links affected by the change. The available bandwidth on each of the network links is the reserved bandwidth on that link and any unreserved bandwidth on that link. The bandwidth reservation component also changes on each of the network links whose reserved bandwidth is affected by the change, the reserved bandwidth according to the change if the change is accepted.

According to another embodiment, a non-transitory computer-readable storage medium provides instructions that, if executed by a processor, will cause the processor to receive a change to a service family within a set of one more service families. Each of the service families includes a set of one or more service versions, and each of the service versions in the service families has one or more network links and a bandwidth requirement representation for each of those links. Each of the service versions has a status being one of obsolete and a set of two or more non-obsolete statuses including the status of activated. At most, one of the service versions in each of the service families can have the status of activated at a time. The instructions will also cause the processor to determine that the change would affect a reserved bandwidth on at least one of the network links affected by the change. The reserved bandwidth for each of the network links is the bandwidth represented by a total of the maximum bandwidth requirement representation for that network link by any non-obsolete service versions within each of the service families, rather than a total of all of the bandwidth requirement representation of all of the non-obsolete service versions. When at least two of the service versions within a service family specify different bandwidth requirement representations for the same affected network link, the larger of these bandwidth requirement representations is the maximum bandwidth requirement representation for the service family. The instructions will also cause the processor to analyze whether to accept the change based on how the change would affect the reserved bandwidth relative to an available bandwidth on each of the network links affected by the change. The available bandwidth on each of the network links is the reserved bandwidth on that link and any unreserved bandwidth on that link. In addition, the instructions will also cause the processor to change on each of the network links whose reserved bandwidth is affected by the change, the reserved bandwidth according to the change if the change is accepted.

In accordance to another embodiment, a network service manager server minimizes the amount of bandwidth reserved for each network link in a network that includes a plurality of network elements whose bandwidth is being managed by the network service manager server. Each of the network links couples different interfaces on different the network elements. The network service manager server includes a processor coupled to a machine readable storage medium having stored therein, a bandwidth reservation component. The bandwidth reservation component receives a change to a service family within a set of one more service families. Each of the service families includes a set of one or more service versions, and each of the service versions in the service families has one or more network links and a bandwidth requirement representation for each of those links. Each of the service versions has a status being one of obsolete and a set of two or more non-obsolete statuses including the status of activated. At most, one of the service versions in each of the service families can have the status of activated at a time. The bandwidth reservation component determines that the change would affect a reserved bandwidth on at least one of the network links affected by the change. The reserved bandwidth for each of the network links is the bandwidth represented by a total of the maximum bandwidth requirement representation for that network link by any non-obsolete service versions within each of the service families, rather than a total of all of the bandwidth requirement representation of all of the non-obsolete service versions. When at least two of the service versions within a service family specify different bandwidth requirement representations for the same affected network link, the larger of these bandwidth requirement representations is the maximum bandwidth requirement representation for the service family. The bandwidth reservation component analyzes whether to accept the change based on how the change would affect the reserved bandwidth relative to an available bandwidth on each of the network links affected by the change. The available bandwidth on each of the network links is the reserved bandwidth on that link and any unreserved bandwidth on that link. The bandwidth reservation component also changes on each of the network links whose reserved bandwidth is affected by the change, the reserved bandwidth according to the change if the change is accepted. The machine readable storage medium also stores a service provisioning manager component to, responsive to changes between which one of the service versions within the service families is currently activated, provision those of the network elements that are affected by the change.

BRIEF DESCRIPTION OF THE DRAWINGS

The invention may best be understood by referring to the following description and accompanying drawings that are used to illustrate embodiments of the invention. In the drawings:

FIG. 4 illustrates service versions of service family that utilize a network link at different points in time according to one embodiment of the invention;

FIG. 5A illustrates the reserved bandwidth on a network link at various points in time according to one embodiment of the invention;

FIG. 5B illustrates the reserved bandwidth on a network link at other points in time according to one embodiment of the invention;

FIG. 5C illustrates the reserved bandwidth on a network link at another point in time according to one embodiment of the invention;

FIG. 5D illustrates the reserved bandwidth on a network link at a different point in time according to one embodiment of the invention;

DESCRIPTION OF EMBODIMENTS

Figure 1:
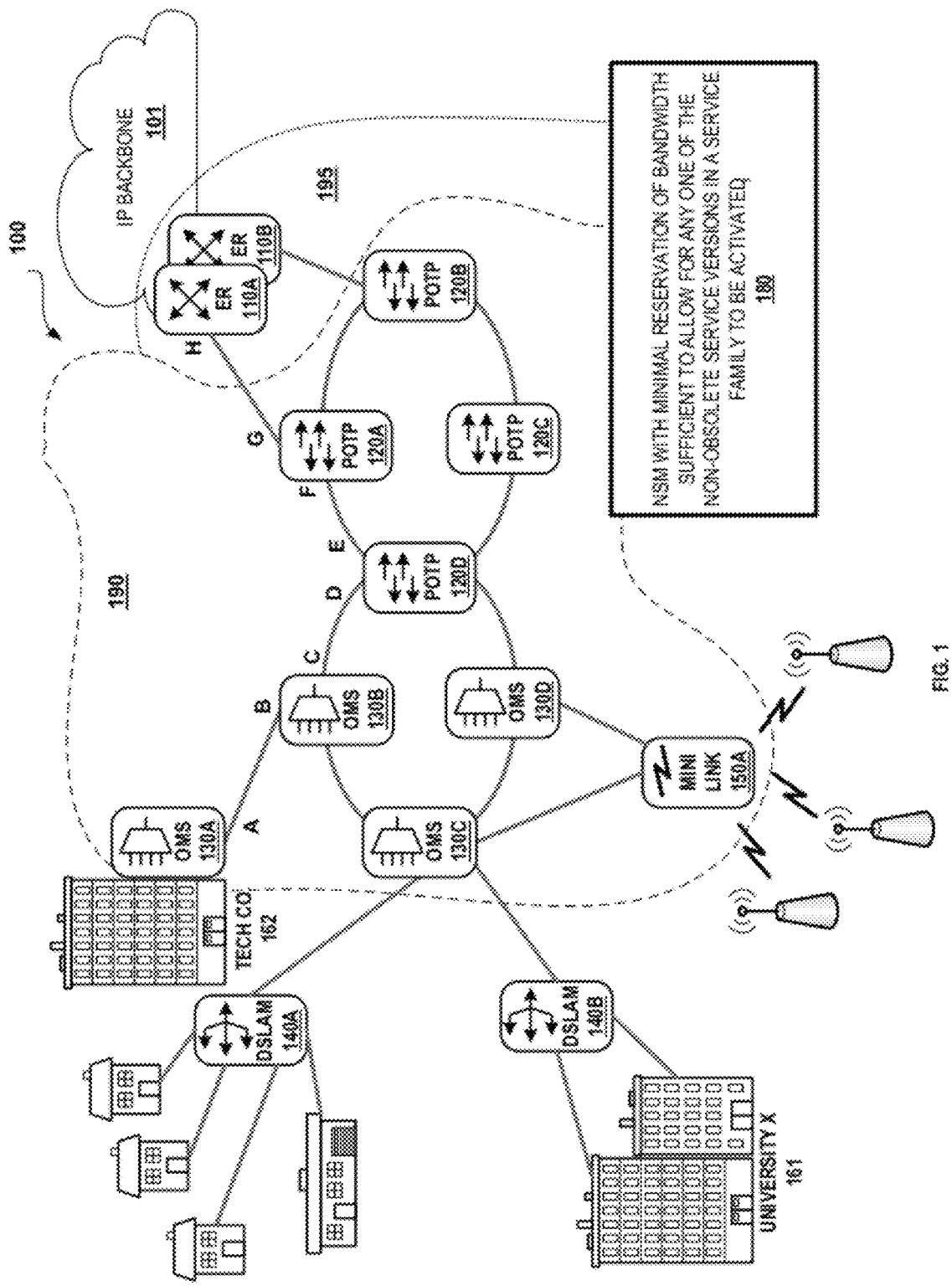
FIG. 1 illustrates a simple example of a network according to one embodiment of the invention.

The following description describes methods and apparatus for reserving bandwidth for network service versions by a network service manager. In the following description, numerous specific details such as implementations of operations and types and interrelationships of system components are set forth in order to provide a more thorough understanding of the present invention. It will be appreciated, however, by one skilled in the art that the invention may be practiced without such specific details. In other instances, control structures and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To allow a service designer greater flexibility to design and provision end-to-end services in a network, the ability to define service versions in a service family have been introduced in a network service manager. A service version is a set of one or more network links that are assigned to a particular customer. Each service version has bandwidth requirement representations associated with each link to represent the bandwidth reservation required for that link. A service family is a set of one or more service versions that are based on a common service template. Only one service version in a service family can be deployed or activated at a time. Service versioning introduces the concept of version control to deployed network services. For example, a service designer may want to redesign some or all of an existing deployed network service to utilize new, low-latency network links. The service designer could do this by designing a new service version that uses those new network links based on an existing service version and then activating the new service version.

One feature of service versioning is the ability for a network designer to switch between non-obsolete service versions. If the network designer identifies a problem in a newly deployed service version, the network designer could revert and rollback to the original service version. Another feature of service versioning is that only the differences between two versions are applied when a user switches from an active service version to a new service version. For example, if only one part of the new service version utilizes a new, low-latency network link, then that part of the service would be automatically identified and only that part of the service would be re-provisioned. Despite these enhanced features to give a service designer greater flexibility in deploying and designing network services, current service versioning techniques do not guarantee that a network service would have the requisite bandwidth reserved on a network link when switching between different non-obsolete service versions Although decentralized network bandwidth reservation protocols such as RSVP and RSVP-TE can be used to reserve bandwidth on some network elements such as some newer edge routers, these protocols do not support the concept of service versioning. These protocols are only able to reserve resources for one service version at a time. Thus, only the bandwidth for the activated service version can be reserved, leaving the bandwidth requirements in non-obsolete service versions unaccounted for. Furthermore, these protocols are ineffective if a network element along a network path lacks the support for these protocols. For example, older network elements such as some previously deployed routers may not support these protocols, and even newer network elements such as some backhaul gateway devices may also not support these protocols. Therefore, instead of solely relying on bandwidth reservation protocols that a particular network element may or may not support, in order to satisfy end-customer Service Level Agreements (SLA), a centralized bandwidth reservation method in a network service manager is used to automatically reserve bandwidth on the network links used by all non-obsolete service versions during the service design phase to allow on-demand activation of any non-obsolete service version within a service family. One method to guarantee all service versions within a service family have the requisite bandwidth reserved on a particular network link is to reserve the total amount of bandwidth required for each and every service version in the service family. However, this method results in an excess of unnecessary reserved bandwidth because only one service version can be activated at a time.

FIG. 1 shows a simple example of a network 100 according to one embodiment of the invention. Network 100 includes an IP backbone 101 coupled to two edge routers (ER) 110A and 110B. The ER 110A and 110B are network elements that form a set of devices 195 that have support for decentralized network bandwidth reservation protocols such as RSVP-TE. Each of the ER 110A and 110B are coupled to respective packet optical transport platform devices (POTP) 120A and 120B. The POTP 120A and 120B along with POTP 120C and 120D forms one optical ring. POTP 120D is also part of another optical ring that includes three optical multiservice transport elements (OMS) 130B-D. OMS 130B is coupled to OMS 130A to provide services to an enterprise customer Tech Company 162. OMS 130C provides connectivity to digital subscriber line access multiplexer device (DSLAM) 140A to deliver services to residential customers represented by the houses and to DSLAM 140B to deliver services to University X 161. OMS 130C and 130D also provide connectivity to mini-link 150A that interfaces to radio base stations represented by the radio towers. The POTP 120A-D, OMS 130A-D, and mini-link 150A form a set of backhaul gateway devices 190 that either lacks a control plane or otherwise does not support decentralized network bandwidth reservation protocols such as RSVP-TE.

By way of example, in the simple network 100, a MPLS-TP network service connects enterprise customer Tech Company 162 to the IP backbone 101. This particular network service has a service family that is based on a MPLS-TP service template that has a minimum required bandwidth per usage of 20 kilobytes per second (kBps) along each hop of the network path. This minimum required bandwidth is the minimum amount of bandwidth that must be reserved on network links utilized by this network service. Depending on the service version, a particular link may utilize a link multiple times, for example, to provide additional bandwidth for protection switching purposes.

In an exemplary service version of this network service family for Tech Company 162, the network path spans four network links: (1) link AB that connects interface A on OMS 130A to interface B on OMS 130B; (2) link CD that connects interface C on OMS 130B to interface D on PTOP 120D; (3) link EF that connects interface E on PTOP 120D to interface F on POTP 120A; and (4) link GH that connects interface G on POTP 120A to interface H on ER 110A. In addition to the minimum required 20 kBps over each network link, this network service version also requires another 20 kBps to be reserved on link AB to provide a backup path between interface A of OMS 130A and interface B on OMS 130B for protection switching purposes. In this exemplary service version, although protocols such as RSVP-TE can be used to perform decentralized bandwidth reservations for interface H on ER 110A that is part of the set of devices 195 that supports RSVP-TE, RSVP-TE would be ineffective for reserving bandwidth on the other interfaces on the network elements OMS 130A-B, POTP 120A, and POTP 120D because these devices are part of the set of devices 190 that either lacks a control plane or otherwise does not support decentralized network bandwidth reservation protocol such as RSVP-TE. Hence, decentralized bandwidth reservation protocols cannot be used to guarantee that the requisite bandwidth is reserved along each network link in this service version of the network service.

To ensure the requisite bandwidth is reserved along each network link of this network service as well as for other services that utilize to at least one device of the set of devices 190 that either lacks a control plane or otherwise does not support decentralized network bandwidth reservation protocol, in one embodiment of the invention both sets of devices 195 and 190 are coupled to and managed by a network service manager (NSM) server 180 for purposes of providing on links with at least one end in the partition 190 centralized bandwidth reservations with minimal reservation of bandwidth sufficient to allow for any one of the non-obsolete service versions in a service family to be activated for the particular network service. It should be noted that in alternative embodiments the NSM server 180 may provide bandwidth reservation management services for links wholly within the partition 190 (e.g., may not be coupled to or not provide bandwidth reservation management on the links of the set of devise 195); may/or may not provide bandwidth reservation management services for links of the set of devices 195 that are not in partition 190; or provide non-bandwidth reservation management services to network devices outside of partition 190 (e.g., for links of the set of devices 195 that are not in partition 190, network devices in the IP backbone 101). It should also be noted that to avoid conflicts between decentralized bandwidth reservation protocols such as RSVP-TE and centralized bandwidth reservations by a NSM server, either RSVP-TE or NSM but not both should be managing bandwidth reservations on a section of a network. A variety of different divisions can be used to separate what parts of a network the centralized bandwidth reservations are used; for example, by network partition, by service family with partition 195, or by designating some part of bandwidth from network elements in partition 195 to be managed.

Figure 2:
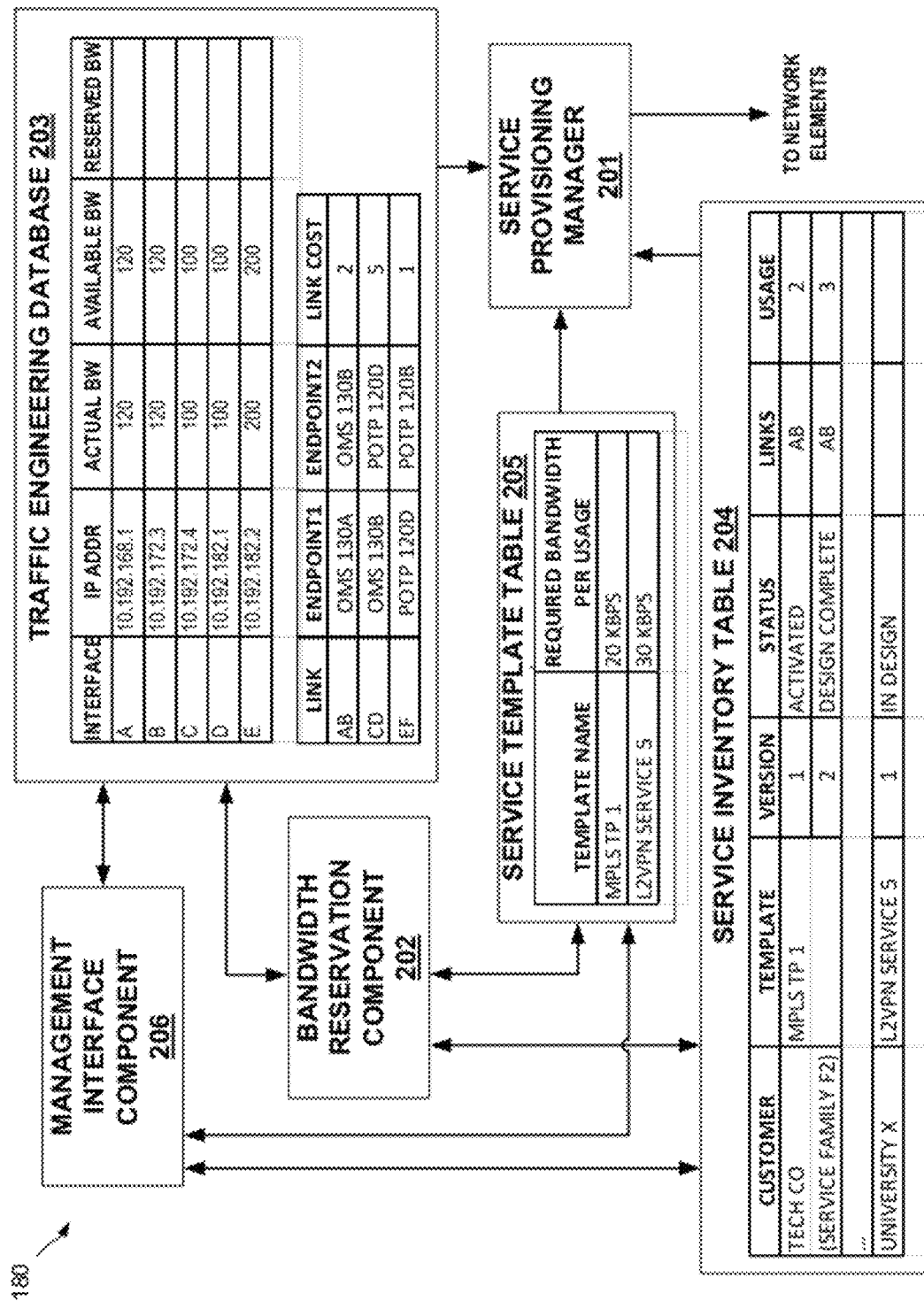
FIG. 2 illustrates a network service manager server according to one embodiment of the invention.

FIG. 2 illustrates a block diagram of some items within NSM server 180 according to one embodiment of the invention. NSM server 180 includes a set of one or more processors (not shown) that is coupled to a non-transitory, machine readable storage medium having stored thereon compatible computer software which causes the set of processors to operate as described herein. While in one embodiment the invention is implemented in software, alternative embodiments may implement one or more parts in hardware.

In one embodiment, NSM server 180 has a management interface component 206 to manage a traffic engineering database 203, a service inventory table 204, and a service template table 205. The traffic engineering database 203 stores attributes associated with interfaces of network elements that are managed by the NSM server 180. These attributes include, for example, for each interface, a network address assigned to the interface, an actual bandwidth specifying the actual amount of bandwidth available for the interface, an available bandwidth specifying a configured maximum amount of bandwidth available for the interface, and a reserved bandwidth indicating the total bandwidth that is reserved on the interface. The actual bandwidth is the physical throughput that the interface can support. The available bandwidth can be set to be either greater or lower than the actual bandwidth. The available bandwidth can be greater than the actual bandwidth to allow the interface to be oversubscribed. The available bandwidth can be lower than the actual bandwidth to allow for future network growth. At any point in time, the sum of the reserved bandwidth on an interface and the unreserved bandwidth on that interface is equal to the available bandwidth on the interface. In other words, the available bandwidth is the total amount of bandwidth that can be reserved on the interface. Any unreserved bandwidth is bandwidth that can be reserved to accommodate any new services. The traffic engineering database 203 also stores attributes that define network links that can be utilized by a network service. These attributes include, for example, for each network link, the two interfaces that are endpoints of that network link and a link cost associated with that network link. While in one exemplary embodiment the traffic engineering database 203 is implemented as a relational database, alternative embodiments may use other types of databases (e.g., object oriented, flat, hierarchical, context-based, or associative).

In one embodiment, the service template table 205 stores a collection of service templates from which service families are built. An example of a service template is a template for building a MPLS-TP service. A MPLS-TP template has a required bandwidth per usage parameter associated with the service to set the minimum bandwidth required per usage for each hop along the network service path. This required bandwidth per usage applies uniformly to all network links used by all service versions in a service family built from the template. In an alternative embodiment, each network link in a network service may have a different required bandwidth per usage defined by the template, but the required bandwidth per usage for each network link is the same across all service versions in the service family. Service templates for other types of services that may be stored in the service template table 205, for example, may include L3 VPN, aggregation service, L2 VPN, and IPSec VPN. These other service templates may have other parameters associated with those services.

In accordance to one embodiment, the service inventory table 204 stores information on customers and network service information associated with each of the customers. The network service information includes at least one service family associated with each customer. Each of the service families includes a set of one or more service versions, with each of the service versions in the service families having one or more network links and bandwidth requirement representations for each of those links. The service inventory table 204 stores the network links of the service versions by service family. The service inventory table 204 also stores the bandwidth requirement representation of each of the network links in each of the service versions and the status of each of the service versions.

In one embodiment, the possible statuses of a service version include obsolete and a set of non-obsolete statuses that includes the status of activated. A status of obsolete indicates that the service version cannot be activated and cannot be deployed. A status of activated indicates that the service version is currently deployed. In an exemplary embodiment, the set of non-obsolete statuses also includes the statuses of in-design and design-complete. In-design indicates that the service version is currently in the design phase and has not yet been deployed. Design-complete indicates that the design of the service version has been completed and finalized, but that the service is not currently deployed (e.g., it has not yet been deployed or was previously deployed but not obsolete). At most, one of the service versions in each of the service families can have the status of activated at a time. In another embodiment, the set of non-obsolete statuses may have additional or alternative statuses.

In an exemplary embodiment, the bandwidth requirement representation of each of the network links is a number representing how many times the network link is utilized by the service version. The total bandwidth required for a network link would then be this number multiplied by the required bandwidth per usage as specified in the service template associated with the service family. A service version can utilize a network link multiple times, for example, to provide additional bandwidth (e.g., protection switching purposes). A network link can also be utilized by more than one service version and by more than one service family. In alternative embodiments, the bandwidth requirement representation may be represented differently, for example, by the total bandwidth required on the network link.

The NSM server 180 also includes a bandwidth reservation component 202 coupled to the traffic engineering database 203, the service template table 205, and the service inventory table 204. In accordance to one embodiment of the invention, when the bandwidth reservation component 202 receives a change to a service family within a set of one or more service families stored in the service inventory table 204 as described above, the bandwidth reservation component 202 determines if the change would affect the reserved bandwidth on at least one of the network links affected by the change. The reserved bandwidth for each of the network links is the bandwidth represented by a total of the maximum bandwidth requirement representation for that network link by any non-obsolete service versions within each of the service families, rather than a total of all of the bandwidth requirement representations of all of the non-obsolete service versions. When at least two of the service versions within a service family specify different bandwidth requirement representations for the same affected network link, the larger of these bandwidth requirement representations is the maximum bandwidth requirement representation for the service family on the particular network link.

In accordance with one embodiment of the invention, the bandwidth reservation component 202 further analyzes whether to accept the change based on how the change would affect the reserved bandwidth relative to the available bandwidth on each of the network links affected by the change. The available bandwidth on each of the network links is the reserved bandwidth on the network link and any unreserved bandwidth on that network link. In one embodiment, this available bandwidth for each network link is defined by the available bandwidths associated with the interfaces that are the endpoints of the link as stored in the traffic engineering database 203. If the reserved bandwidth according to the change does not exceed the available bandwidth, then the change is accepted and the bandwidth reservation component 202 changes the reserved bandwidth on each of the network links whose reserved bandwidth is affected by the change. The change in reserved bandwidth is reflected in the traffic engineering database 203 on the interfaces that are endpoints of the affected links.

In accordance to one embodiment of the invention, the NSM server 180 also includes a service provision manager component 201 coupled to the traffic engineering database 203, the service template table 205, the service inventory table 204, and to the network elements managed by the NSM server 180. The service provision manager component 201 provisions those of the affected ones of the network elements in response to changes between which one of the service versions within the service families is currently activated. When the status of a service version is changed to activated, the service provision manager component 201 communicates with, configures, and provisions the affected network elements to deploy the activated service version.

By way of example, interfaces A through E and network links AB, CD, and EF as depicted in FIG. 1 and as discussed above may have attributes stored in the traffic engineering database 203 as shown in FIG. 2. Interfaces F-H and network links GH are not shown. The network service for customer Tech Company 162 is based on the MPLS-TP 1 service template stored in the service template table 205 and has a required bandwidth per usage of 20 kBps for each network link utilized by this network service. The service family F2 in the service inventory table 204 is designated for the network service for Tech Company 162. In this example, the bandwidth requirement representation is a number representing how many times the network link is utilized by a service version. Service version 1 of the service family F2 utilizes link AB and has a bandwidth requirement representation of 2. This means the requisite reserved bandwidth on link AB for service version 1 of service family F2 is 40 kBps (2×20 kBps). The service versions in service family F2 utilize additional network links that are not shown in the service inventory table 204.

Figure 3A:
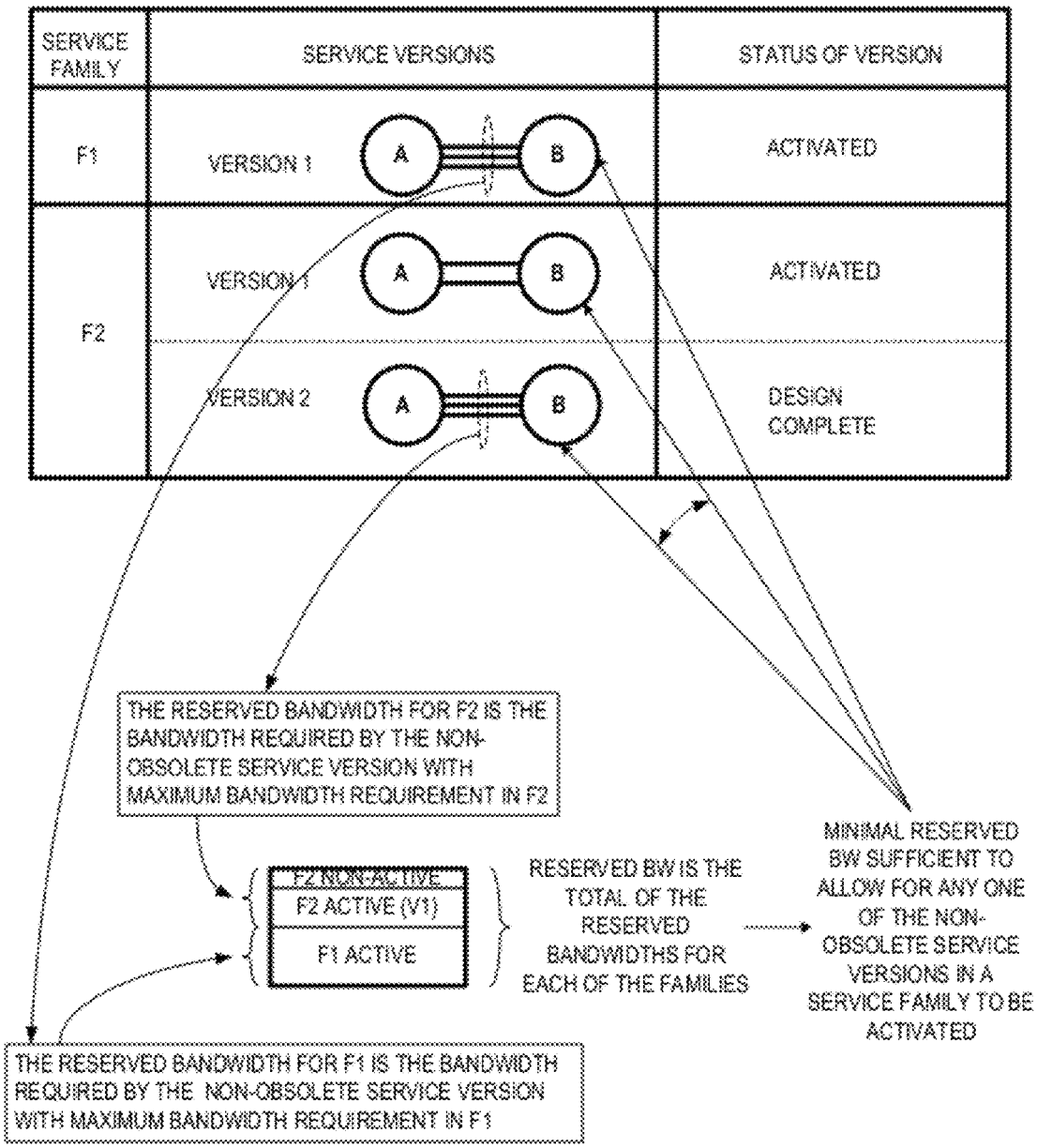
FIG. 3A illustrates bandwidth reservation on a network link according to one embodiment of the invention.

By way of example, to provide a better understanding of bandwidth reservations in service versions of service families according to one embodiment of the invention, FIG. 3A shows a diagram illustrating the reserved bandwidth on link AB. Interface A is represented by the circle with the letter A, and interface B is represented by the circle with the letter B. The bandwidth requirement representation of each link is represented by the number of horizontal lines connecting the interfaces. Further to the example above, suppose another service family F1 also based on service template MPLS-TP 1 (with required bandwidth per usage of 20 kBps) for another customer has only one service version (version 1) and utilizes link AB with a bandwidth requirement representation of 3. Service version 1 of service family F1 has a status of activated. In service family F2 (for Tech Company 162), in addition to the service version 1 described above (service version 1 utilizes link AB with a bandwidth requirement representation of 2), service family F2 also has service version 2 that utilizes link AB with a bandwidth requirement representation of 3. In service family F2, version 21 has the status of activated and version 2 has the status of design-complete. Suppose further that the interfaces on link AB have an available bandwidth of 120 kBps.

When determining the minimal requisite reserved bandwidth on a network link, only non-obsolete service versions need to be considered because an obsolete service version by definition cannot be activated. The status of an obsolete service version cannot be changed to a non-obsolete status and therefore can never be activated. Regarding service family F1, the minimal requisite reserved bandwidth on link AB for service family F1 is the bandwidth required by the non-obsolete service version with the maximum bandwidth requirement representation in service family F1. In this case, service family F1 has only one service version. Hence, the maximum bandwidth requirement representation in service family F1 for link AB is the bandwidth requirement representation in service version 1. Service version 1 has a bandwidth requirement representation of 3 on link AB, and therefore the minimal requisite reserved bandwidth on link AB for service family F1 is 3×20 kBps=60 kBps.

Regarding service family F2, the minimal requisite reserved bandwidth on link AB for service family F2 is the bandwidth required by the non-obsolete service version with the maximum bandwidth requirement representation in service family F2, which in this case, is service version 2. Hence, the maximum bandwidth requirement representation in service family F2 for link AB is the bandwidth requirement representation on link AB in service version 2. Service version 2 has a bandwidth requirement representation of 3, and therefore the minimal requisite reserved bandwidth on link AB for service family F2 is 3×20 kBps=60 kBps. Within the reserved bandwidth on link AB for service family F2, only 40 kBps associated with service version 1 is active because service version 1 is the version that has the status of activated. Although the other 20 kBps associated with the extra bandwidth needed for service version 2 is reserved for service family F2, this 20 kBps is non-active because it is not actively being utilized by service family F2. This extra 20 kBps becomes active only when service version 2 is activated and the status of service version 1 is changed to a status other than activated, for example, design-complete. Nevertheless, it is necessary to reserve this extra 20 kBps in order to guarantee that there will be sufficient bandwidth for either service version 1 or service version 2 to be activated in service family F2.

Note that the minimal requisite reserved bandwidth on link AB for service family F2 is represented by the maximum bandwidth requirement representation of all non-obsolete service versions in service family F2 rather than a total of all bandwidth requirement representation of all non-obsolete service versions in accordance with one embodiment of the invention. If the total of all bandwidth requirement represen-tation of all non-obsolete service versions is used instead, then in this example the reserved bandwidth associated with service family F2 would be (2+3)×20 kBps=100 kBps. Reserving 100 kBps for service family F2 results in an excess of unnecessary reserved bandwidth because only one service version of service family F2 can be activated at any one time, and service family F2 can at most use 60 kBps when service version 2 is activated.

Furthermore, if a total of all bandwidth requirement representation of all non-obsolete service versions is used to represent the minimal requisite reserved bandwidth, the change to add service version 2 would be rejected. If 100 kBps is to be reserved for service family F2, this would require a total of 100 kBps (service family F2)+60 kBps (service family F1)=160 kBps to be reserved on link AB. 160 kBps exceeds the 120 kBps available bandwidth on link AB, and hence this change would be rejected if the total of all bandwidth requirement representation of all non-obsolete service versions is used.

In accordance to one embodiment of the invention, the reserved bandwidth on link AB is then the total of the reserved bandwidths for each of the service families that utilize link AB. In this example, the total is then equal to the sum of 60 kBps for service family F1 and 60 kBps for service family F2 or a total of 120 kBps. Thus, all 120 kBps of the available bandwidth on link AB must be reserved because 120 kBps is the minimal reserved bandwidth sufficient to allow for any one of the non-obsolete service versions in a service family to be activated.

Figure 3B:
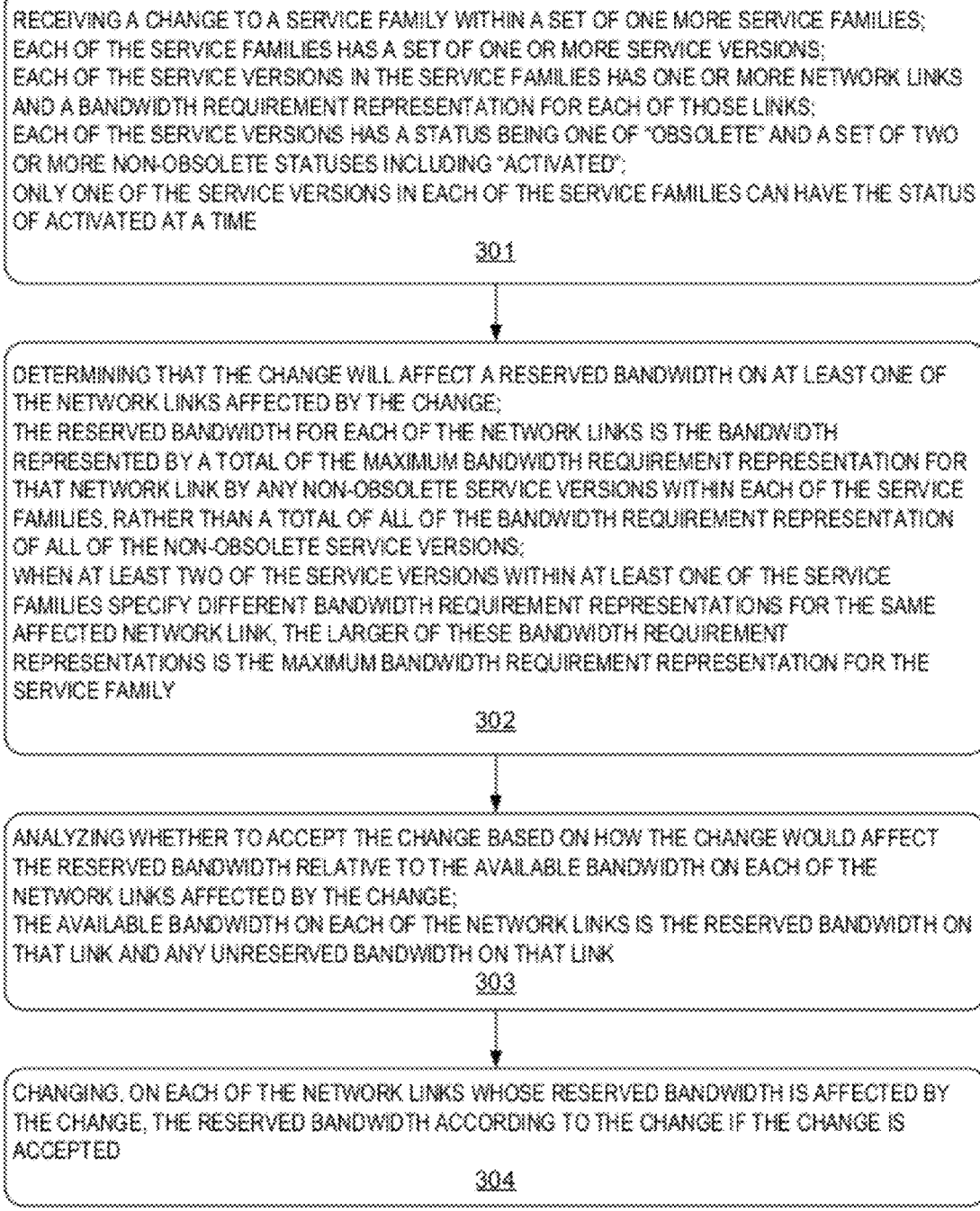
FIG. 3B illustrates a bandwidth reservation method according to one embodiment of the invention.

FIG. 3B is a flow diagram illustrating a centralized bandwidth reservation method to minimize the amount of bandwidth reserved for each network link in a network whose bandwidth is being managed by a network service manager server. A decentralized network bandwidth reservation protocol would only reserve bandwidth for the activated service version on network elements that do support the protocol, and not for other network elements or for any non-activated and non-obsolete service versions. The method described herein is advantageous because any non-obsolete service version within a service family can be activated on-demand without an excess of unnecessary reserved bandwidth for any network service including any service that utilizes network elements that do not support decentralized network bandwidth reservation protocol. The operations of the flow diagram will be described with reference to the exemplary embodiment of FIG. 2. However, it should be understood that the operations of the flow diagram in FIG. 3B can be performed by embodiments of the invention other than those discussed with reference to FIG. 2, and the embodiments discussed with reference to FIG. 2 can perform operations different than those discussed with reference to the flow diagram of FIG. 3B.

In block 301, a change to a service family within a set of one or more service families is received in, for example, the bandwidth reservation component 202 of FIG. 2. As described above, each of the service versions in the service families includes one or more network links and has a bandwidth requirement representation for each of those links. Each of the service versions has a status being one of obsolete and a set of two or more non-obsolete statuses. The set of two or more non-obsolete statuses include the status of activated, and only one of the service versions in each of the service families can have the status of activated at a time.

The change can be, for example, a new service version of one of the service versions being changed in the service family. In other words, a new service version is being created from one of the already existing service versions in the service family. Similar to the other service versions, the new service version has one or more network links and has a bandwidth requirement representation for each of those links in accordance to one embodiment of the invention. The bandwidth requirement representations can be greater than, lower than, or equal to the bandwidth requirement representations of the service version that is being changed. A new service version with a bandwidth requirement representation of zero for a network link has the effect of eliminating that network link in the new service version. In one embodiment, the new service version can have additional network links that are not already present in the service version being changed.

The change can also be, for example, a change to obsolete one of the service versions in a service family. Changing the status of a service version to obsolete results in that service version being removed from a set of service versions that can be activated in the service family. Other types of changes include changing the status of a service version to other non-obsolete statuses, for example, from in-design to design-complete or from activated to design-complete. However, these other types of changes have no effect on the minimal reserved bandwidth sufficient to allow for any one of the non-obsolete service version in a service family to be activated.

In block 302, the bandwidth reservation component 202 determines if the change affects a reserved bandwidth on at least one of the network links affected by the change. The reserved bandwidth for each of the network links is the bandwidth represented by a total of the maximum bandwidth requirement representation for that network link by any non-obsolete service versions within each of the service families, rather than a total of all of the bandwidth requirement representation of all of the non-obsolete service versions. Thus, when at least two of the service versions within at least one of the service families specify different bandwidth requirement representations for the same affected network link, the larger of these bandwidth requirement representations is the maximum bandwidth requirement representation for the service family.

In block 303, the bandwidth reservation component 202 analyzes whether to accept the change based on how the change would affect the reserved bandwidth relative to the available bandwidth on each of the network links affected by the change. The available bandwidth on each of the network links is stored in the traffic engineering database 203 and is the reserved bandwidth on that link plus any unreserved bandwidth on that link at any one point in time. A change is accepted if the reserved bandwidth according to the change does not exceed the available bandwidth on that link.

In block 304, the bandwidth reservation component 202 changes, on each of the network links whose reserved bandwidth is affected by the change, the reserved bandwidth according to the change if the change is accepted. The change is reflected in the reserved bandwidth for each of the network links in traffic engineering database 203. If the change is rejected, for example, because the reserved bandwidth according to the change exceeds the available bandwidth on the network link, then the change cannot become part of the service family.

FIG. 4 illustrates an example of a series of changes received to service family F2 according to one embodiment of the invention, and FIGS. 5A-D illustrates how these changes affect the reserved bandwidth on link AB according to one embodiment of the invention. This example extends from the example as described in FIG. 3A where link AB has an available bandwidth of 120 kBps and the required bandwidth per usage in the network services associated with link AB is 20 kBps. The encircled numbers represent events at time N when a change to service family F2 is received. FIG. 4 includes a table with three columns identified in a heading row as service family, service version originated at time N, and status of service version at time N. Thus, the service version originated column includes a circled time N only for when the service version was originated, but the state of service version at time N includes a circled time N for each N shown and the status at that time. There is a row for each of service families F1 and F2, and the remaining columns of service family F2 are broken into 4 sub rows.

At time 1, service family F1 has only service version 1 that utilizes link AB with a bandwidth requirement representation of 3. The status of service version 1 in service family F1 at times 1-7 is activated. Throughout this example, the service family F1 does not change. Service family F2 has only service version 1 that utilizes link AB with a bandwidth requirement representation of 2 at time 1. The status of service version 1 in service family F2 at time 1 is activated.

The reserved bandwidth on link AB at time 1 is shown in FIG. 5A. At time 1, both service families F1 and F2 each only has one service version (version 1) that utilizes link AB. The minimal amount of reserved bandwidth for link AB to allow any non-obsolete service version in any service family that utilizes link AB to be activated is simply the required bandwidth per usage (20 kBps) multiplied by the total of the bandwidth requirement representation on link AB (3) for the only service version (version 1) in service family F1 and the bandwidth requirement representation on link AB (2) for the only service version (version 1) in service family F2. Hence, the reserved bandwidth for link AB is 20 kBps×(3+2)=100 kBps. Of the 100 kBps reserved bandwidth, 60 kBps is reserved and active for service version 1 of service family F1, and 40 kBps is reserved and active for service version 1 of service family F2. The amount of unreserved bandwidth on link AB is 20 kBps because there is 120 kBps of available bandwidth on link AB.

At time 2, a new service version 2 is introduced into service family F2; service version 2 has a status of in-design indicating that this service version is only in the design phase and is not yet deployed. Service version 2 has a bandwidth requirement representation on link AB of 3. When this change of a new service version is received in the bandwidth reservation component 202 of the NSM server 180, the bandwidth reservation component 202 determines if this change would affect the reserved bandwidth on link AB. At time 2, the reserved bandwidth on link AB for service family F1 does not change because no changes are associated with service family F1. The maximum bandwidth requirement representation in service family F1 remains at 3, and the minimal amount of reserved bandwidth for link AB to allow any non-obsolete service version in service family F1 to be activated remains at 60 kBps.

Regarding service family F2, in order to allow any non-obsolete service version of service family F2 to be activated, rather than having a reserved bandwidth represented by a total of all of the bandwidth requirement representation of all non-obsolete service versions (in this example, 2 (for version 1)+3 (for version 2)=5), the reserved bandwidth is represented by the maximum bandwidth requirement representation of all non-obsolete service versions (in this example, 3 is the maximum of version 1 and version 2), according to one embodiment of the invention. Because the maximum bandwidth requirement representation in service family F2 has now changed from 2 to 3, bandwidth reservation component 202 determines that the change in service family F2 does affect the reserved bandwidth on link AB.

Bandwidth reservation component 202 then analyzes whether to accept this change based on how this change would affect the reserved bandwidth relative to the available bandwidth on link AB. As noted above, the maximum bandwidth requirement representation in service family F1 remains at 3, and the minimal amount of reserved bandwidth for link AB to allow any non-obsolete service version in service family F1 to be activated remains at 60 kBps. In service family F2, the maximum bandwidth requirement representation has now increased from 2 to 3 according to the change, and the minimal amount of reserved bandwidth for link AB to allow any non-obsolete service version in service family F2 to be activated is now 60 kBps. The minimal amount of reserved bandwidth to allow any non-obsolete service version in any service family that uses link AB to be activated according to the change is then 60 kBps (for service family F1)+60 kBps (for service family F2)=120 kBps. The reserved bandwidth according to the change (120 kBps) does not exceed the available bandwidth (120 kBps) on the link AB. Hence, the bandwidth reservation component 202 accepts the change and changes the reserved bandwidth on link AB.

The reserved bandwidth on link AB at time 2 is shown in FIG. 5B. All 120 kBps of available bandwidth on link AB is reserved. Of the 120 kBps of reserved bandwidth, 60 kBps is reserved and active for service version 1 of service family F1. 40 kBps is reserved and active for service version 1 of service family F2. 20 kBps is reserved and is non-active for service family F2. This 20 kBps is reserved for service family F2 such that any non-obsolete service version in service family F2 including service version 2 which requires 60 kBps can be activated on-demand. At time 2, the amount of unreserved bandwidth on link AB is 0 kBps.

At time 3, a change is received that changes the status of service version 1 of service family F2 from activated to design-complete, and the status of service version 2 of service family F2 from in-design to activated. The bandwidth reservation component 202 determines that the change in service family F2 does not affect the reserved bandwidth on link AB, because the maximum bandwidth requirement representation in service family F2 has not changed. The change is then accepted because the reserved bandwidth remains equal to the available bandwidth and hence does not exceed the available bandwidth.

FIG. 5C illustrates the reserved bandwidth on link AB at time 3. As noted already, the overall reserved bandwidth has not changed. Because service version 2 of service family F2 is activated, all 60 kBps reserved for service family F2 is active at time 3. As this sequence illustrates, the extra 20 kBps non-active reserved bandwidth that was reserved for service family F2 at time 2 allows service version 2 to be activated at time 3. If the extra 20 kBps was not reserved at time 2, other services could have taken up that bandwidth, and as a consequence, prevent service version 2 from being activated because there are no unreserved bandwidth left on link AB to accommodate the activation of service version 2.

At time 4, a new service version 3 is being introduced into service family F2. Service version 3 starts with a status of in-design indicating that this service version is only in the design phase. Service version 3 has a bandwidth requirement representation on link AB of 5. When this change of a new service version is received in the bandwidth reservation component 202, the bandwidth reservation component 202 determines if this change would affect the reserved bandwidth on link AB. Regarding service family F2, in order to allow any non-obsolete service version of service family F2 to be activated, the reserved bandwidth is represented by the maximum bandwidth requirement representation of all non-obsolete service versions (in this example, 5 is the maximum of versions 1 through 3). Because the maximum bandwidth requirement representation in service family F2 has increased from 3 to 5 according to the change, bandwidth reservation component 202 determines that the change in service family F2 does affect the reserved bandwidth on link AB.

Bandwidth reservation component 202 then analyzes whether to accept this change based on how this change would affect the reserved bandwidth relative to the available bandwidth on link AB. In service family F2, the maximum bandwidth requirement representation has now increased from 3 to 5 according to the change, and the minimal amount of reserved bandwidth for link AB to allow any non-obsolete service version in service family F2 to be activated is now 100 kBps. The minimal amount of reserved bandwidth to allow any non-obsolete service version in any service family that uses link AB to be activated according to the change is then 60 kBps (for service family F1)+100 kBps (for service family F2)=160 kBps. The reserved bandwidth according to the change (160 kBps) exceeds the available bandwidth (120 kBps) on the link AB. Hence, the bandwidth reservation component 202 rejects the change and service version 3 does not become part of service family F2.

FIG. 5D illustrates the reserved bandwidth on link AB at time 4 if the change has been accepted. 60 kBps is reserved and active for service version 1 of service family F1. In order to accommodate service version 3 of service family F2, an extra 40 kBps would be required to be reserved on link AB in addition to the 60 kBps that is already reserved for service family F2. However, this extra 40 kBps would cause the reserved bandwidth on link AB to exceed the 120 kBps available bandwidth on link AB. Thus, the bandwidth reservation component 202 rejects this change to prevent traffic from being dropped or refusal of service if service version 3 is ever deployed.

At time 5, a change is received to change the status of service version 2 of service family F2 from activated to design-complete, and to change the status of service version 1 of service family F2 from design-complete to activated. The bandwidth reservation component 202 determines that the change in service family F2 does not affect the reserved bandwidth on link AB, because the maximum bandwidth requirement representation in service family F2 has not changed. The change is then accepted because the reserved bandwidth remains equal to the available bandwidth and hence does not exceed the available bandwidth.

FIG. 5B illustrates the reserved bandwidth on link AB at time 5 (which is the same as it was at time 2). All 120 kBps of available bandwidth on link AB is reserved. Of the 120 kBps of reserved bandwidth, 60 kBps is reserved and active for service version 1 of service family F1. Of the 60 kBps that was previously reserved and active for service family F2, 40 kBps is now reserved and active for service version 1, and 20 kBps is reserved and non-active for service version 2. The amount of unreserved bandwidth on link AB remains at 0 kBps.

At time 6, a change is received to change the status of service version 2 of service family F2 from design-complete to obsolete. When this change is received, the bandwidth reservation component 202 determines if this change would affect the reserved bandwidth on link AB. Regarding service family F2, with service version 2 being obsolete, only one service version remains, and the maximum bandwidth requirement representation of all non-obsolete service versions according to the change would then be 2 (2 is the maximum of version 1). Because the maximum bandwidth requirement representation in service family F2 has now changed from 3 to 2, bandwidth reservation component 202 determines that the change in service family F2 does affect the reserved bandwidth on link AB.

Bandwidth reservation component 202 then analyzes whether to accept this change based on how this change would affect the reserved bandwidth relative to the available bandwidth on link AB. In service family F2, the maximum bandwidth requirement representation has now decreased from 3 to 2 according to the change, and the minimal amount of reserved bandwidth for link AB to allow any non-obsolete service version in service family F2 to be activated is now reduced to 40 kBps. The minimal amount of reserved bandwidth to allow any non-obsolete service version in any service family that uses link AB to be activated according to the change is then 60 kBps (for service family F1)+40 kBps (for service family F2)=100 kBps. The reserved bandwidth according to the change (100 kBps) does not exceed the available bandwidth (120 kBps) on the link AB. Hence, the bandwidth reservation component 202 accepts the change.

FIG. 5A illustrates the reserved bandwidth on link AB at time 6 (which is the same as it was at time 1). 100 kBps of 120 kBps available bandwidth on link AB is reserved. Of the 100 kBps of reserved bandwidth, 60 kBps is reserved and active for service version 1 of service family F1, and 40 kBps is reserved and active for service version 1 of service family F2. Because the reserved bandwidth according to the change at time 6 is less than the previously reserved bandwidth at time 5, bandwidth is released resulting in 20 kBps that becomes unreserved on link AB.

At time 7, a new service version 4 has been added to service family F2. Service version 4 has a status of design-complete indicating that the design of this service version is finished. Service version 4 has a bandwidth requirement representation on link AB of 1. When this change of a new service version is received in the bandwidth reservation component 202, the bandwidth reservation component 202 determines if this change would affect the reserved bandwidth on link AB. Regarding service family F2, in order to allow any non-obsolete service version of service family F2 to be activated, the reserved bandwidth is represented by the maximum bandwidth requirement representation of all non-obsolete service versions (in this example, 2 is the maximum of version 1 and version 4; version 2 is obsolete, and version 3 was never accepted). Because the maximum bandwidth requirement representation in service family F2 remains at 2 according to the change, bandwidth reservation component 202 determines that the change in service family F2 does not affect the reserved bandwidth on link AB. The change is then accepted because the reserved bandwidth on link AB remains less than the available bandwidth on link AB. The reserved bandwidth on link AB at time 7 is illustrated in FIG. 5A (which is the same as it was at time 1 and time 6).

Figure 6:
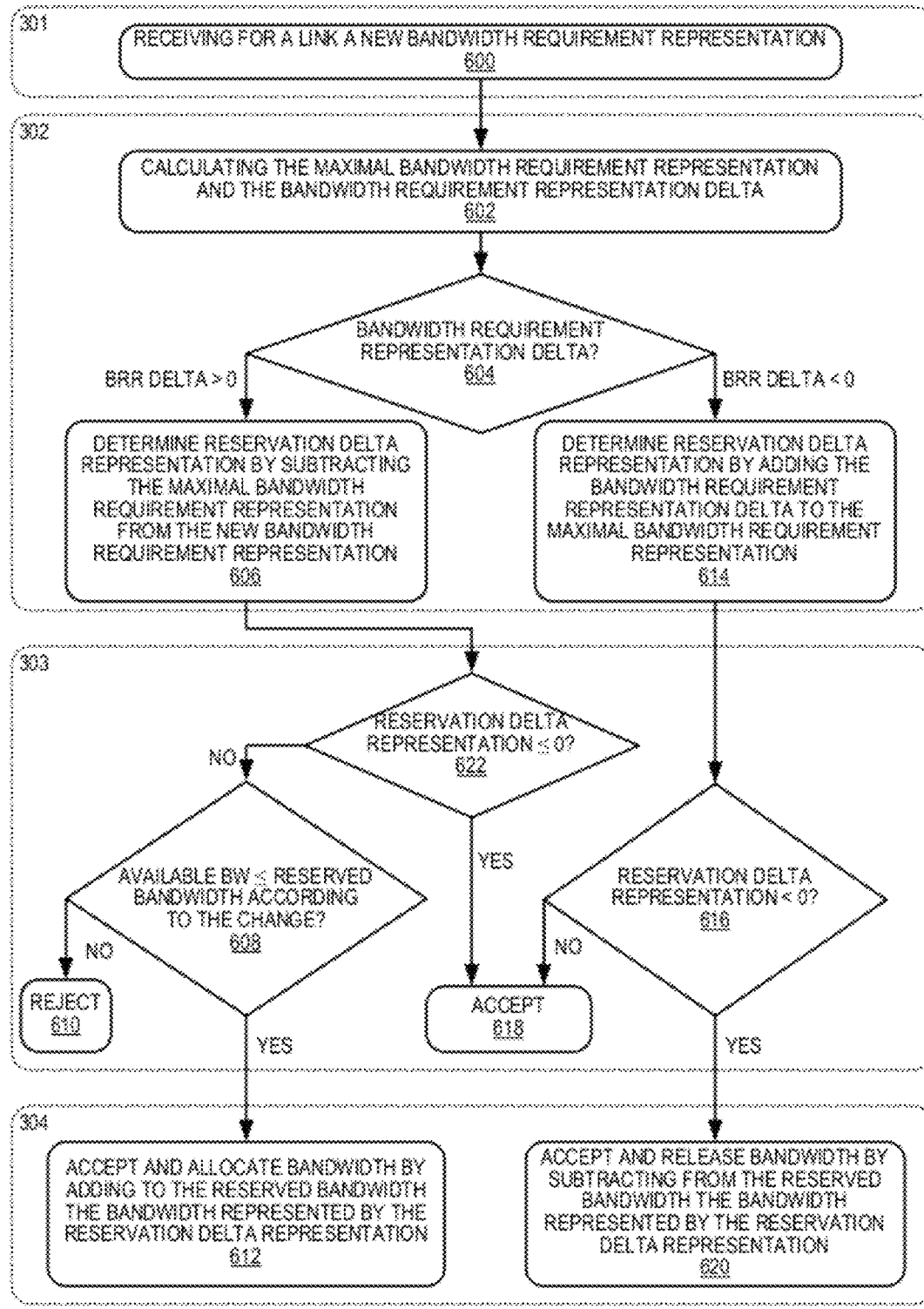
FIG. 6 illustrates an example implementation of a bandwidth reservation method according to one embodiment of the invention.

FIG. 6 is a flow diagram illustrating an exemplary implementation of the flow diagram of FIG. 3B, according to one embodiment of the invention. It should be understood that the flow diagram of FIG. 3B can be implemented with operations different than those discussed below with reference to FIG. 6. The operations of the flow diagram in FIG. 6 will be described with reference to the operations of FIG. 3B and with reference to the exemplary embodiment of FIG. 2. However, it should be understood that the operations of the flow diagram in FIG. 6 can be performed by embodiments of the invention other than those discussed with reference to FIG. 2, and the embodiments discussed with reference to FIG. 2 can perform operations different than those discussed with reference to the flow diagram of FIG. 6.

The operations in FIG. 6 are described with reference to one network link. However, it should be understood that the operations can be applied to multiple network links in a service version of a service family by operating on each one of the network links in a service version of a service family. In operation 600, the change to a service family received by the bandwidth reservation component 202 as described in operation 301 is a new bandwidth requirement representation for a network link associated with a new service version of one of the service versions being changed in the service family. The new service version has one or more network links and a bandwidth requirement representation for each of those links. The bandwidth requirement representations for these network links can be greater than, lower than, or equal to the previous bandwidth requirement representations in the service version being changed. The received change may be associated with creating a new service version from the service version being changed, or be associated with a change to obsolete one of the service versions, for example, by changing the status of a service version from design-complete to obsolete.

In one embodiment, operation 302 can be implemented with operations 602, 604, 606, and 614. In operation 602, the bandwidth reservation component 202 calculates the maximal bandwidth requirement representation in the service family of the network link affected by the change and the bandwidth requirement representation delta of the network link. The maximal bandwidth requirement representation in the service family is the largest bandwidth requirement representation of that network link over service versions that have a non-obsolete status in the service family. The bandwidth requirement representation delta is the difference between the new bandwidth requirement representation of the new service version and the bandwidth requirement representation of that network link in the service version that is being changed (i.e. the previous bandwidth requirement representation without the newly received change). In the case where the change is to obsolete a service version, the effect of this change is to set the new bandwidth requirement representations of the network links in the service version to zero. Hence, in such cases, the bandwidth requirement representation delta would simply be the negative of the bandwidth requirement representation of the corresponding network link in the service version being obsolete.

In operation 604, the bandwidth reservation component 202 decides whether to proceed with operation 606 or operation 614 depending on the bandwidth requirement representation delta determined in operation 602. If the bandwidth requirement representation delta is zero, meaning that the new bandwidth requirement representation is the same as the previous bandwidth requirement representation, then the change does not affect the reserved bandwidth on this link. The change to this link can be accepted without further operations if the rest of the change can be accepted on any other links affected by the change; any other network links associated with the change can be processed in parallel or serially, but the change will not be accepted unless all affected links can accommodate the change.

The reservation delta representation represents either the additional bandwidth that needs to be reserved or any excess bandwidth that can be released in order to allow any non-obsolete service version of a service family to be activated if the received change is accepted. If the bandwidth requirement representation delta is positive, meaning the new bandwidth requirement representation is greater than the previous bandwidth requirement representation, then the reservation delta representation is determined in operation 606 by subtracting the maximal bandwidth requirement representation from the new bandwidth requirement representation. If the bandwidth requirement representation delta is negative, meaning the new bandwidth requirement representation is less than the previous bandwidth requirement representation, then the reservation delta representation is determined in operation 614 by adding the maximal bandwidth requirement representation to the bandwidth requirement representation delta.

In accordance to one embodiment, operation 303 can be implemented with operations 622, 608, 610, 616 and 618. The operations associated with the bandwidth requirement representation delta being positive (operations 622, 608, 610, and 618) are described first. In operation 622, if the reservation delta representation is less than or equal zero, the change is then accepted in operation 618 (assuming the change can be accepted on any other affected links). The change is accepted because although the new bandwidth requirement representation is greater than the bandwidth requirement representation of the service version being changed, the new bandwidth requirement representation is either less than or equal to some other bandwidth requirement representation of the link in another non-obsolete service version in the service family. Hence, there is no net impact on the reserved bandwidth on the affected network link.

If the reservation delta representation is greater than zero, then accepting the change would require additional bandwidth to be reserved to allow any non-obsolete service version in the service family to be activated. In order to determine if this additional bandwidth is available in operation 608, the available bandwidth as defined in the traffic engineering table 203 on a network link is compared to the reserved bandwidth according to the change. In one embodiment, the bandwidth represented by the reservation delta representation is the required bandwidth per usage as defined in the service template table 205 multiplied by the reservation delta representation. The reserved bandwidth according to the change would then be the total of this bandwidth and the previously reserved bandwidth. If the reserved bandwidth according to the change is less than or equal to the available bandwidth, then the change can be accepted (assuming the change can be accepted on any other affected links). If not, then there is not enough unreserved bandwidth to accommodate the change, and the change is rejected by the bandwidth reservation component 202 in operation 610.

The operations associated with the bandwidth requirement representation delta being negative (operations 616 and 618) are now described. In operation 616, if the reservation delta representation is positive, even though the new bandwidth requirement representation is less than the bandwidth requirement representation of the service version being changed, there is still no net impact on the reserved bandwidth on the affected network link because some other non-obsolete service version in the service family is requiring the reserved bandwidth to remain reserved for this service family. Hence, the change can be accepted in operation 618 without further operations (assuming the change can be accepted on any other affected links). If the reservation delta representation is not positive, then the amount of bandwidth on the network link represented by the reservation delta representation can be released because this amount of bandwidth is no longer needed by any non-obsolete service version of the service family (assuming the change can be accepted on any other affected links). In other words, if the change is accepted, any non-obsolete service version of the service family can be activated without reserving this excess amount of bandwidth represented by the reservation delta representation.

In one embodiment, operation 304 can be implemented with operations 612 and 620. Having determined that the received change does affect the reserved bandwidth on the network link and that the change can be accepted, the bandwidth reservation component 202 accepts the change and proceeds to change the reserved bandwidth on the network link. If additional bandwidth is to be allocated for the new service version, then bandwidth is allocated by adding to the reserved bandwidth the bandwidth represented by the reservation delta representation in operation 612. If excess bandwidth is to be released, then bandwidth is released by subtracting from the reserved bandwidth the bandwidth represented by the reservation delta representation in operation 620.

Figure 7:
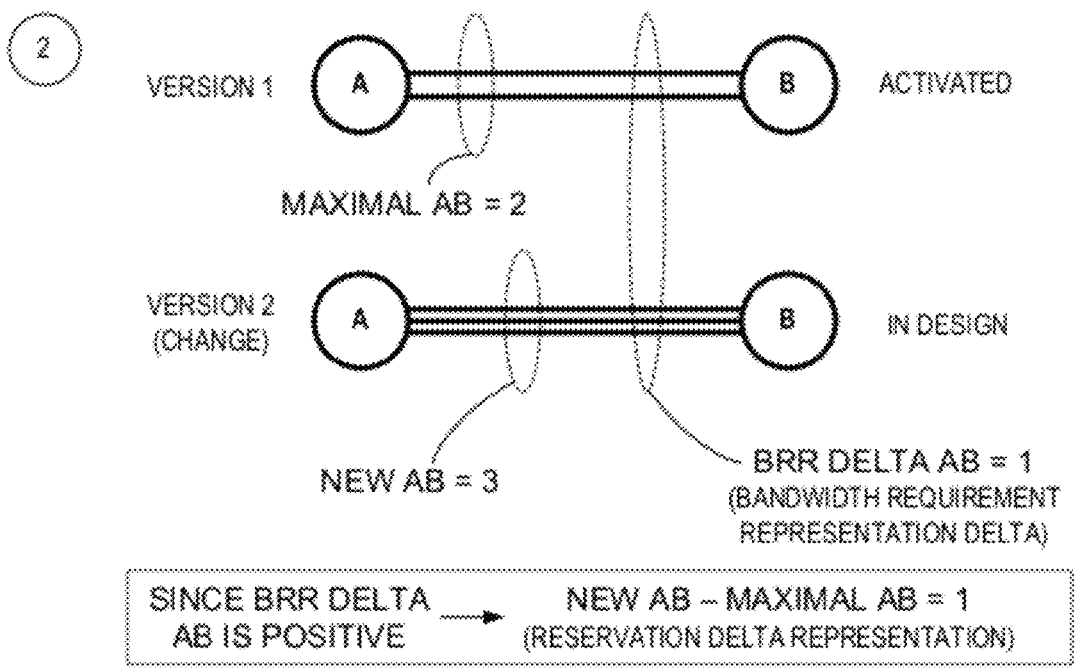
FIG. 7 illustrates calculations of parameters for a network link at one point in time in an example implementation of a bandwidth reservation method according to one embodiment of the invention.

To more clearly illustrate the operations according to one embodiment of the invention as described above in reference to FIG. 6, by way of example, FIGS. 7 through 10 show the state of service family F2 at various points in time as previously discussed and how the operations of FIG. 6 are applied to this service family. FIG. 7 shows the network link AB as utilized in service family F2 at time 2 when new service version 2 is introduced into the service family. The change received in operation 600 at time 2 is a new service version 2, and the service version on which the change is based is service version 1. The new bandwidth requirement representation in service version 2 for link AB is 3. In operation 602, the maximal bandwidth requirement representation is calculated as 2, because 2 is the maximum bandwidth requirement representation over all non-obsolete service versions (this is only service version 1 at time 2). The bandwidth requirement representation delta is calculated as 1, because 1 is the difference between the new bandwidth requirement representation (3) in the new service version 2 and the bandwidth requirement representation (2) in the service version being changed (service version 1 is being changed). In operation 604, the bandwidth requirement representation delta is determined to be positive (1 is positive), and hence the reservation delta representation is determined as described in operation 606. Subtracting the maximal bandwidth requirement representation (2) from the new bandwidth requirement representation (3) yields 1, which is the reservation delta representation at this time. In operation 622, the reservation delta representation is determined to be positive. Hence, operation 608 is executed. Referring back to FIG. 5B, at time 2, the reserved bandwidth according to the change is equal to the available bandwidth on link AB. Hence, the change is accepted and the additional bandwidth is allocated in operation 612.

Figure 8:
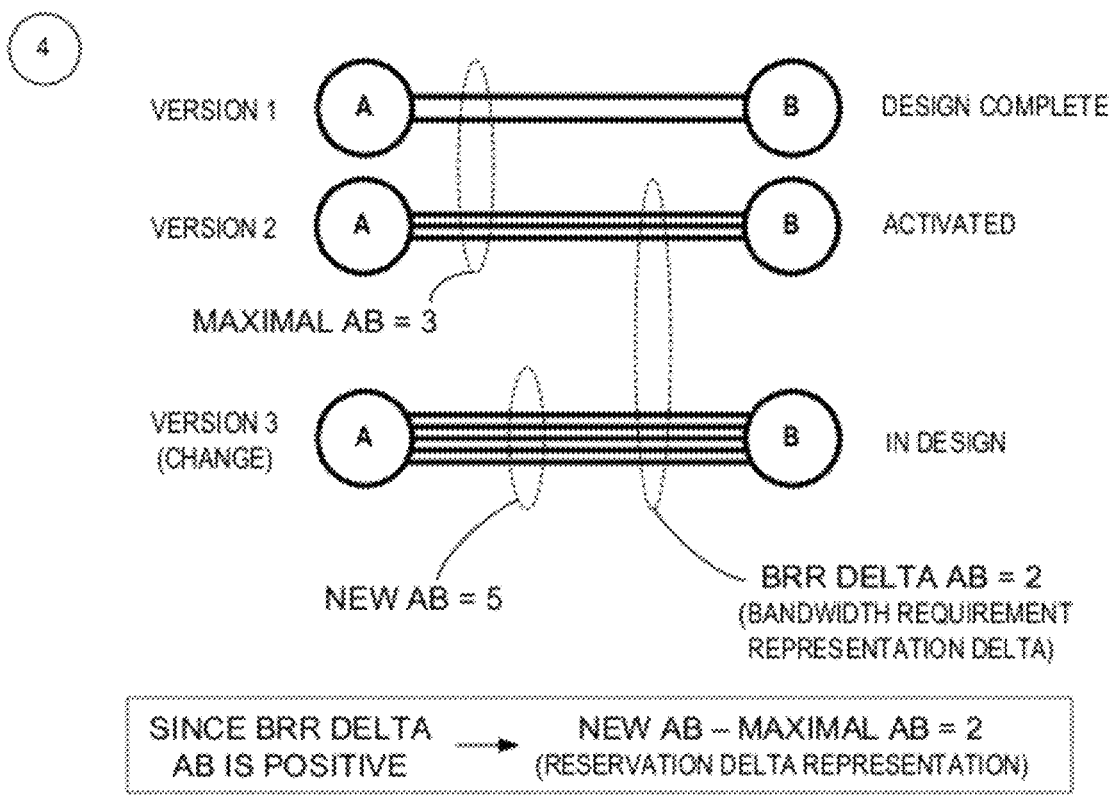
FIG. 8 illustrates calculations of parameters for a network link at a different point in time in an example implementation of a bandwidth reservation method according to one embodiment of the invention.

FIG. 8 shows the network link AB as utilized in service family F2 at time 4 when new service version 3 is being introduced into the service family. The change received in operation 600 at time 4 is a new service version 3, and the service version on which the change is based is service version 2. The new bandwidth requirement representation in service version 3 for link AB is 5. In operation 602, the maximal bandwidth requirement representation is calculated as 3, because 3 is the maximum bandwidth requirement representation over all non-obsolete service versions (service versions 1 and 2 at time 4). The bandwidth requirement representation delta is calculated as 2, because 2 is the difference between the new bandwidth requirement representation (5) in the new service version 3 and the bandwidth requirement representation (3) in the service version being changed (service version 2 is being changed). In operation 604, the bandwidth requirement representation delta is determined to be positive (2 is positive), and hence the reservation delta representation is determined as described in operation 606. Subtracting the maximal bandwidth requirement representation (3) from the new bandwidth requirement representation (5) yields 2, which is the reservation delta representation at this time. In operation 622, the reservation delta representation is determined to be positive. Hence, operation 608 is executed. Referring back to FIG. 5D, at time 4, the reserved bandwidth according to the change is greater than the available bandwidth on link AB. Hence, the change is rejected in operation 610.

Figure 9:
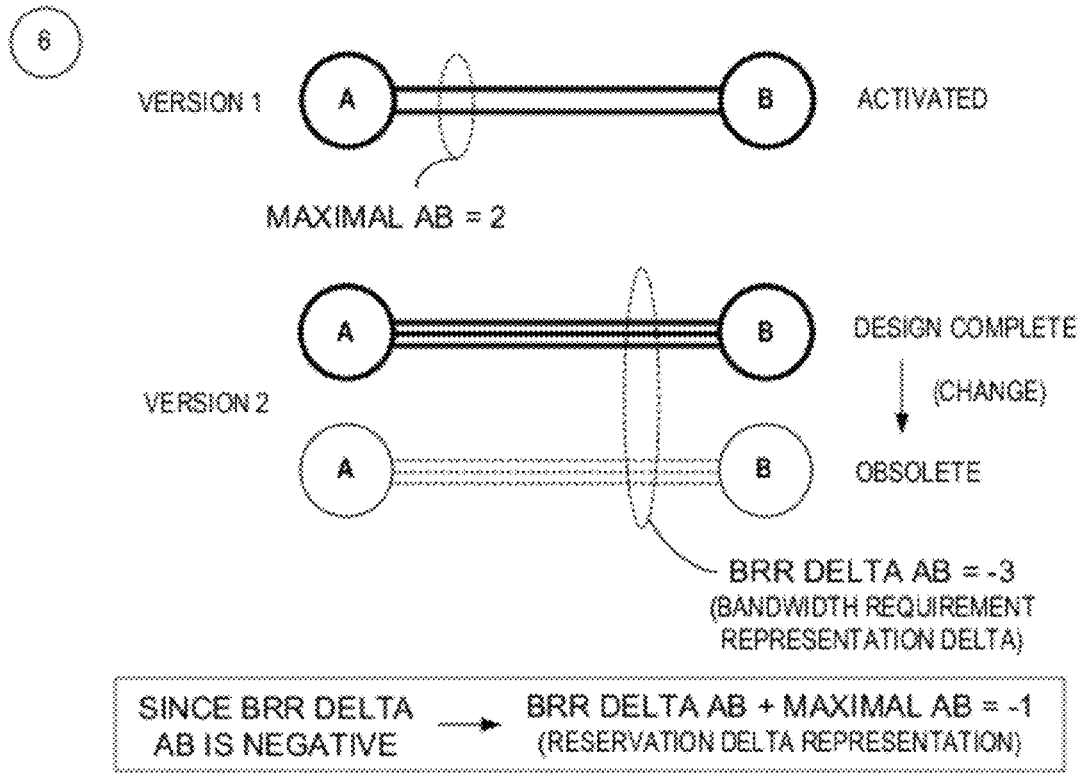
FIG. 9 illustrates calculations of parameters for a network link at another point in time in an example implementation of a bandwidth reservation method according to one embodiment of the invention.

FIG. 9 shows the network link AB as utilized in service family F2 at time 6 when service version 2 is being obsolete. The change received in operation 600 at time 6 is to obsolete service version 2, and in this case the service version on which the change is based is service version 2. In operation 602, the maximal bandwidth requirement representation is calculated as 2, because 2 is the maximum bandwidth requirement representation over all non-obsolete service versions (service versions 1 at time 6). The bandwidth requirement representation delta is calculated as −3, because −3 is the difference between the new bandwidth requirement representation (0) and the bandwidth requirement representation (3) in the service version being changed (service version 2 is being changed). In operation 604, the bandwidth requirement representation delta is determined to be negative (−3 is negative), and hence the reservation delta representation is determined as described in operation 614. Adding the bandwidth requirement representation delta (−3) to the maximal bandwidth requirement representation (2) yields −1, which is the reservation delta representation at this time. In operation 616, the reservation delta representation is determined to be negative. Hence, operation 620 is executed. The change is accepted and the amount of bandwidth represented by the reservation delta representation is released resulting in the reserved bandwidth as shown in FIG. 5A.

Figure 10:
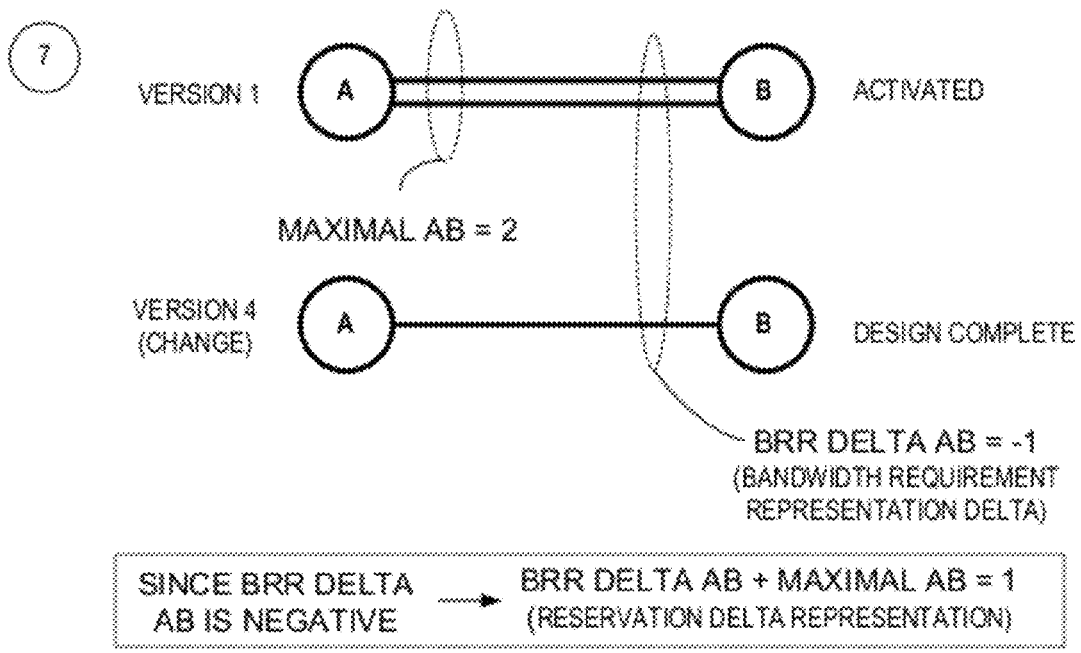
FIG. 10 illustrates calculations of parameters for a network link at a further point in time in an example implementation of a bandwidth reservation method according to one embodiment of the invention.

FIG. 10 shows the network link AB as utilized in service family F2 at time 7 when new service version 4 is introduced into the service family. The change received in operation 600 at time 7 is a new service version 4, and the service version on which the change is based is service version 1. The new bandwidth requirement representation in service version 4 for link AB is 1. In operation 602, the maximal bandwidth requirement representation is calculated as 2, because 2 is the maximum bandwidth requirement representation over all non-obsolete service versions (this is only service version 1 at time 7). The bandwidth requirement representation delta is calculated as −1, because −1 is the difference between the new bandwidth requirement representation (1) in the new service version 4 and the bandwidth requirement representation (2) in the service version being changed (service version 1 is being changed). In operation 604, the bandwidth requirement representation delta is determined to be negative (−1 is negative), and hence the reservation delta representation is determined as described in operation 614. Adding the bandwidth requirement representation delta (−1) to the maximal bandwidth requirement representation (2) yields 1, which is the reservation delta representation at this time. In operation 616, the reservation delta representation is determined to be positive. Hence, the change is accepted in operation 618 without the need for any further operations.

The techniques described herein can be implemented using code and data stored and executed on one or more electronic devices (e.g., server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

Alternative Embodiments

While embodiments of the invention have been described in which bandwidth on exemplary network elements are reserved, alternative embodiments of the invention may in addition or alternatively reserve bandwidth on any network elements.

Also, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In addition, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network service manager server to minimize the amount of bandwidth reserved for each network link in a network that includes a plurality of network elements whose bandwidth is being managed by the network service manager server, each of the network links coupling different interfaces on different ones of the network elements, the method comprising the steps of:

receiving a change to a service family within a set of one or more service families, wherein each of the service families includes a set of one or more service versions, each of the service versions in the service families comprises one or more network links and comprises a bandwidth requirement representation for each of those links, each of the service versions has a status being one of obsolete and a set of two or more non-obsolete statuses, wherein an obsolete service version cannot be activated, wherein the non-obsolete statuses include activated, and only one of the service versions in each of the service families can have the status of activated at a time, and wherein the bandwidth requirement representation is only for each of those links;

determining that the change would affect a reserved bandwidth on at least one of the network links affected by the change, wherein the reserved bandwidth for each of the network links is the bandwidth represented by a total of the maximum bandwidth requirement representation for that network link by any non-obsolete service versions within each of the service families, rather than a total of all of the bandwidth requirement representation of all of the non-obsolete service versions, wherein at least two of the service versions within at least one of the service families specify different bandwidth requirement representations for the same affected network link and the larger of these bandwidth requirement representations is the maximum bandwidth requirement representation for the service family; and analyzing whether to accept the change based on how the change would affect the reserved bandwidth relative to an available bandwidth on each of the network links affected by the change, wherein the available bandwidth on each of the network links is the reserved bandwidth on that link and any unreserved bandwidth on that link; and changing, on each of the network links whose reserved bandwidth is affected by the change, the reserved bandwidth according to the change if the change is accepted.

2. The method of claim 1, wherein the change is a new service version of one of the service versions being changed in one of the service families, wherein the new service version comprises one or more network links and comprises, for each of those links, a bandwidth requirement representation, and the determining comprises, for each of those links:
   calculating a maximal bandwidth requirement representation over all service versions having a non-obsolete status in the service family; and
   calculating a bandwidth requirement representation delta between the new service version and the one of the service versions being changed.

3. The method of claim 2, wherein the determining further comprises:
   for each link having a positive bandwidth requirement representation delta, subtracting the maximal bandwidth requirement representation from the bandwidth requirement representation of the new service version to determine the reserved bandwidth according to the change.

4. The method of claim 1, wherein the change is to obsolete one of the service versions being changed in one of the service families, and the determining comprises, for each of the links in the service version being changed:
   calculating a maximal bandwidth requirement representation over all service versions having a non-obsolete status in the service family;
   calculating a bandwidth requirement representation delta in the service version being changed; and
   adding the maximal bandwidth requirement representation to the bandwidth requirement representation delta to determine the reserved bandwidth according to the change.

5. The method of claim 1, wherein at least one of the plurality of network elements is a backhaul gateway device that lacks a control plane.

6. The method of claim 1, wherein at least one of the plurality of network elements does not support a decentralized network bandwidth reservation protocol.

7. The method of claim 1, wherein the bandwidth requirement representation is a number representing how many times one of the service versions utilizes one of the network links.

8. A non-transitory computer-readable storage medium that provides instructions that, if executed by a processor, will cause the processor to perform operations comprising:
   receive a change to a service family within a set of one or more service families, wherein each of the service families includes a set of one or more service versions, each the service versions in the service families comprises one or more network links and comprises a bandwidth requirement representation for each of those links, each of the service versions has a status being one of obsolete and a set of two or more non-obsolete statuses, wherein an obsolete service version cannot be activated, wherein the non-obsolete statuses include activated, and only one of the service versions in each of the service families can have the status of activated at a time, and wherein the bandwidth requirement representation is only for each of those links;
   determine that the change would affect a reserved bandwidth on at least one of the network links affected by the change, wherein the reserved bandwidth for each of the network links is the bandwidth represented by a total of the maximum bandwidth requirement representation for that network link by any non-obsolete service versions within each of the service families, rather than a total of all of the bandwidth requirement representation of all of the non-obsolete service versions, wherein at least two of the service versions within at least one of the service families specify different bandwidth requirement representations for the same affected network link and the larger of these bandwidth requirement representations is the maximum bandwidth requirement representation for the service family; and
   analyze whether to accept the change based on how the change would affect the reserved bandwidth relative to an available bandwidth on each of the network links affected by the change, wherein the available bandwidth on each of the network links is the reserved bandwidth on that link and any unreserved bandwidth on that link; and
   change, on each of the network links whose reserved bandwidth is affected by the change, the reserved bandwidth according the change if the change is accepted.

9. The non-transitory computer-readable storage medium of claim 8, wherein the change is a new service version of one of the service versions being changed in one of the service families, wherein the new service version comprises one or more network links and comprises, for each of those links, a bandwidth requirement representation, and the determining comprises, for each of those links:
   calculating a maximal bandwidth requirement representation over all service versions having a non-obsolete status in the service family; and
   calculating a bandwidth requirement representation delta between the new service version and the one of the service versions being changed.

10. The non-transitory computer-readable storage medium of claim 9, wherein the determining further comprises:
   for each link having a positive bandwidth requirement representation delta, subtracting the maximal bandwidth requirement representation from the bandwidth requirement representation of the new service version to determine the reserved bandwidth according to the change.

11. The non-transitory computer-readable storage medium of claim 8, wherein the change is to obsolete one of the service versions being changed in one of the service families, and the determining comprises, for each of the links in the service version being changed:
   calculating a maximal bandwidth requirement representation over all service versions having a non-obsolete status in the service family;
   calculating a bandwidth requirement representation delta in the service version being changed; and
   adding the maximal bandwidth requirement representation to the bandwidth requirement representation delta to determine the reserved bandwidth according to the change.

12. The non-transitory computer-readable storage medium of claim 8, wherein the bandwidth requirement representation is a number representing how many times one of the service versions utilizes one of the network links.

13. A network service manager server to minimize the amount of bandwidth reserved for each network link in a network that includes a plurality of network elements whose bandwidth is being managed by the network service manager server, each of the network links coupling different interfaces on different ones of the network elements, the network service manager server comprising:
   a processor coupled to a machine readable storage medium having stored therein,
      a bandwidth reservation component to,
         receive a change to a service family within a set of one or more service families, wherein each of the service families includes a set of one or more service versions, each of the service versions in the service families comprises one or more network links and comprises a bandwidth requirement representation for each of those links, each of the service versions has a status being one of obsolete and a set of two or more non-obsolete statuses, wherein an obsolete service version cannot be activated, wherein the non-obsolete statuses include activated, and only one of the service versions in each of the service families can have the status of activated at a time, and wherein the bandwidth requirement representation is only for each of those links;
         determine that the change would affect a reserved bandwidth on at least one of the network links affected by the change, wherein the reserved bandwidth for each of the network links is the bandwidth represented by a total of the maximum bandwidth requirement representation for that network link by any non-obsolete service versions within each of the service families, rather than a total of all of the bandwidth requirement representation of all of the non-obsolete service versions, wherein at least two of the service versions within at least one of the service families specify different bandwidth requirement representations for the same affected network link and the larger of these bandwidth requirement representations is the maximum bandwidth requirement representation for the service family;
         analyze whether to accept the change based on how the change would affect the reserved bandwidth relative to the available bandwidth on each of the network links affected by the change, wherein the available bandwidth on each of the network links is the reserved bandwidth on that link and any unreserved bandwidth on that link; and
         change, on each of the network links whose reserved bandwidth is affected by the change, the reserved bandwidth according the change if the change is accepted; and
      a service provisioning manager component to, responsive to changes between which one of the service versions within the service families is currently activated, provision those of the affected ones of the network elements.

14. The network service manager server of claim 13, further comprises:
   a management interface component to manage,
      a service inventory table to store the network links of the service versions by service family, the bandwidth requirement representation of each of the network links in each of the service versions, and the status of each of the service versions; and
   a traffic engineering database to store the available bandwidth and reservation reserved bandwidth of each of the network links.

15. The network service manager server of claim 13, wherein the change is a new service version of one of the service versions being changed in one of the service families, the new service version comprises one or more network links and comprises, for each of those links, a bandwidth requirement representation, and wherein the bandwidth reservation component to determine that the change would affect a reserved bandwidth is further, for each of those links, to:
   calculate a maximal bandwidth requirement representation over all service versions having a non-obsolete status in the service family; and
   calculate a bandwidth requirement representation delta between the new service version and the one of the service versions being changed.

16. The network service manager server of claim 13, wherein the bandwidth reservation component to determine that the change would affect a reserved bandwidth is further to:
   for each link having a positive bandwidth requirement representation delta, subtract the maximal bandwidth requirement representation from the bandwidth requirement representation of the new service version to determine the reserved bandwidth according to the change.

17. The network service manager server of claim 13, wherein the change is to obsolete one of the service versions being changed in one of the service families, and the bandwidth reservation component to determine that the change would affect a reserved bandwidth is further, for each of the links in the service version being changed, to:
   calculate a maximal bandwidth requirement representation over all service versions having a non-obsolete status in the service family;
   calculate a bandwidth requirement representation delta in the service version being changed; and
   add the maximal bandwidth requirement representation to the bandwidth requirement representation delta to determine the reserved bandwidth according to the change.

18. The network service manager server of claim 13, wherein at least one of the plurality of network elements is a backhaul gateway device that lacks a control plane.

19. The network service manager server of claim 13, wherein at least one of the plurality of network elements does not support a decentralized network bandwidth reservation protocol.

20. The network service manager server of claim 14, wherein the traffic engineering database is a relational database.

* * * * *

UNITED STATES PATENT AND TRADEMARK OFFICE
CERTIFICATE OF CORRECTION

| | |
|---|---|
| PATENT NO. | : 8,711,880 B2 |
| APPLICATION NO. | : 13/049828 |
| DATED | : April 29, 2014 |
| INVENTOR(S) | : Weeks |

It is certified that error appears in the above-identified patent and that said Letters Patent is hereby corrected as shown below:

In the Specification

In Column 11, Line 16, delete "version 21" and insert -- version 1 --, therefor.

Signed and Sealed this
Sixteenth Day of September, 2014

Michelle K. Lee
*Deputy Director of the United States Patent and Trademark Office*